Feb. 26, 1957 J. H. REAVES 2,783,314

SQUARE-WAVE AMPLIFIER CIRCUITS

Filed May 29, 1952

INVENTOR

JOHN H. REAVES

BY *Howard L. Rose*

AGENT

Patented Feb. 26, 1957

2,783,314

SQUARE-WAVE AMPLIFIER CIRCUITS

John H. Reaves, Washington, D. C., assignor to the United States of America as represented by the Secretary of Commerce Application May 29, 1952, Serial No. 290,840

5 Claims. (Cl. 179—171)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to electron tube circuits and in particular to an amplifier circuit which is used to produce large power outputs from small power inputs without appreciably altering the wave form of the input voltage. The amplifier according to the present invention may advantageously be employed in feeding a capacitive load over a wide range of frequencies.

In many power amplifiers it is the practice to supply the power output tube directly from a voltage amplifier tube. This procedure causes some distortion in the wave form because of the large interelectrode capacitance of the power output tube. In a typical circuit small amplitude voltage waves are fed to a voltage amplifier tube. In order to obtain the large amplitude voltage wave required to drive the output tube, it is necessary to use a very high resistance in the plate circuit of the amplifier tube. When the output tube is fed directly from this amplifier tube the circuit charging the interelectrode capacitance of the output tube has a large time constant, and as a result the input becomes distorted.

It is the primary object of the invention to provide a tube network in which the distortion caused by the large interelectrode capacitance of the output tube can be greatly reduced.

Another object of the invention is to provide an electron tube network in which the interelectrode capacitances of the output tube are charged through a low impedance circuit having a small time constant.

It is another object of the invention to provide an output circuit for the voltage amplifier tube which has a small time constant.

Another object of the invention is to provide a circuit through which the interelectrode capacitances of the output tube can be rapidly discharged.

Other uses and advantages of the invention will become apparent upon reference to the specification and drawings.

Figure 1:
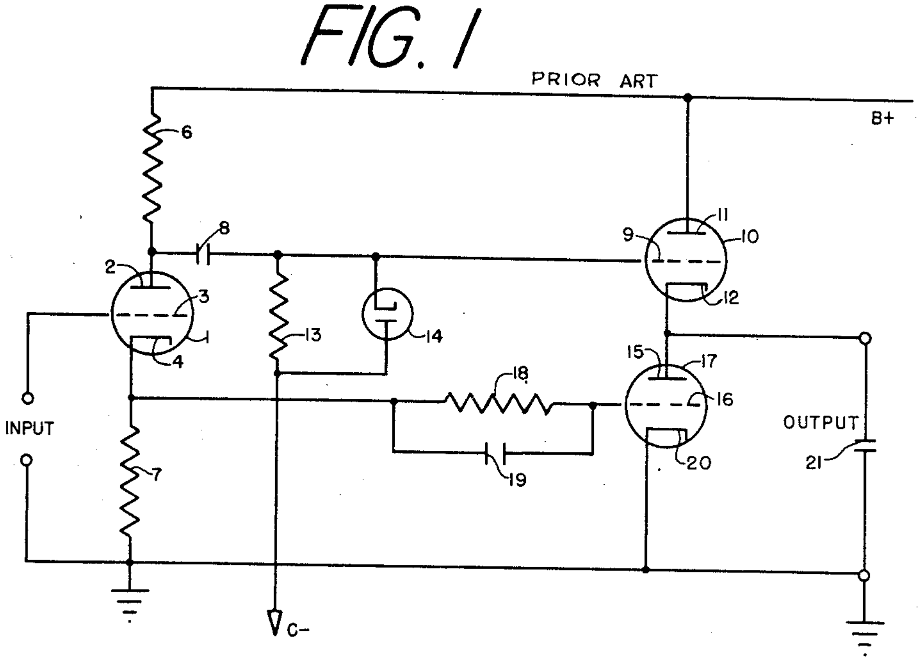
Figure 1 is a circuit diagram showing a typical prior art device in which distortion will occur because of the large interelectrode capacitances in the power tube input circuit.

Referring to Figure 1, there is shown a circuit for supplying power to a capacitive load 21. The circuit includes a first signal amplifying stage comprising a tube 1, having an anode 2, control grid 3, and cathode 4. This tube has a load resistor 6 connected from the plate 2 to B+ and a resistor 7 connected from the cathode 4 to ground. The plate output of tube 1 is applied through the condenser 8 to the grid 9 of the output tube 10, which also has a plate 11 connected directly to the B+ supply and a cathode 12 connected to the plate 15 of tube 17. Bias is supplied for the grid 9 by means of the direct-current restorer circuit consisting of the condenser 8, resistor 13, and the diode 14, the latter two elements being connected in parallel from a negative voltage source to the grid 9. The output across the cathode resistor 7 is applied to the grid 16 of the tube 17 through the resistor 18 and condenser 19, which are in parallel. These provide a grid leak bias for the tube 17. The cathode 20 of tube 17 is grounded. The output to the capacitive load 21 is taken from the junction between the cathode of the tube 10 and plate of the tube 17 and ground.

When a square wave is applied to the input of the tube 1, the tube will conduct and the voltage across the resistor 7 will increase, thereby raising the grid potential on the tube 17, causing the latter tube to conduct. At the same time the voltage at the plate 2 decreases, thereby biasing the tube 10 to cutoff. As a result the capacitive load 21 will be discharged through the tube 17 since tube 10 presents a high impedance path while tube 17 acts as a low resistance under such conditions. As the voltage across the input falls and returns to zero, as when the trailing edge of the square wave is reached, the voltage at the anode 2 will now rise, thereby causing the tube 10 to conduct. The voltage across the resistor 7 will now decrease, and the tube 17 will therefore be biased to cutoff. As a result the capacitive load 21 will be charged through the tube 10. The time constant of this load charging circuit will be comparatively low, since the only resistance in the circuit is the internal resistance of the tube 10.

When this circuit is used to supply a large power output, it is necessary that the voltage amplification in the plate circuit of the tube 1 be very large. Therefore the resistor 6 must have a very high value and, due to the large input capacitance of the tube 10, the resulting plate circuit will have a large time constant. The tube 10 must have a large load-carrying capacity and because of the structure of such heavy duty tubes, the interelectrode capacitances are high. A large time constant in the above circuit will tend to destroy the shape of the input voltage wave. The present invention is primarily concerned with eliminating such difficulty.

Figure 2:
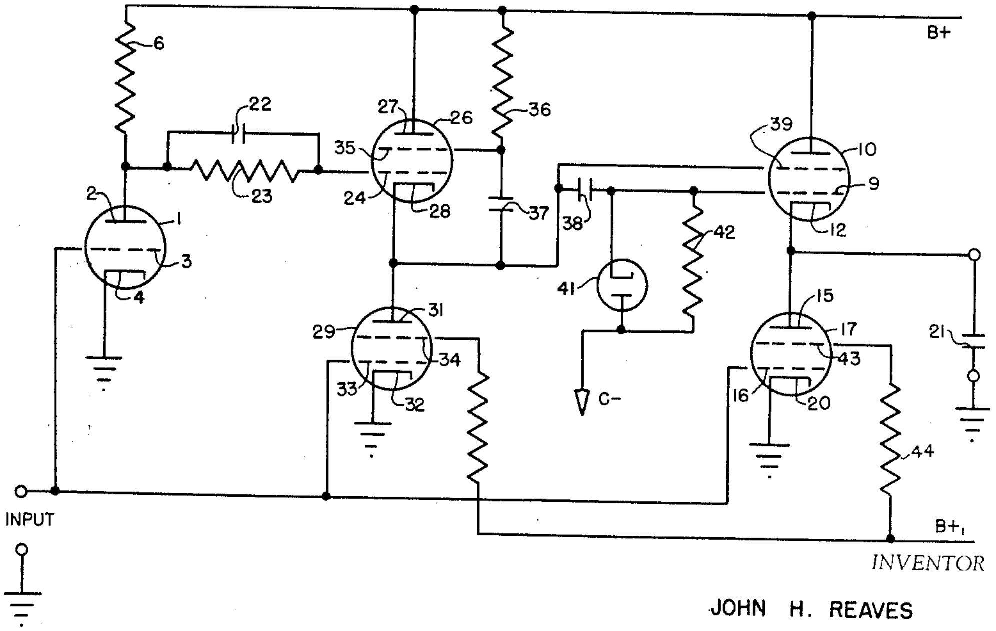
Figure 2 is a circuit diagram showing the circuitry of the present invention incorporated in the circuit of Figure 1.

Referring to Figure 2, where the present invention is shown applied to the circuit of Figure 1, components corresponding to components in Figure 1 will carry the same numbers. In this circuit the plate output of the amplifier tube 1 feeds the signal grid 24 of the tube 26 through a parallel condenser 22-resistor 23 network. Anode 27 of this tube is connected directly to the B+ supply. The cathode 28 is connected to ground through the tube 29, which has a plate 31, cathode 32, signal grid 33, and screen grid 34. The cathode 28 of tube 26 is directly coupled to the plate 31 of tube 29. The screen grid 35 of the tube 26 is connected to the junction of the resistor 36 and the condenser 37, which are connected in series between the B+ supply and the cathode 28. The cathode 28 is connected through the condenser 38 to the grid 9 of the tube 10. The screen grid 39 of tube 10 is directly connected to the cathode 28. The condenser 38, diode 41, and resistor 42 form a direct-current restorer network for biasing the grid 9. The screen grid 43 of tube 17 is connected to a direct-current source through resistor 44 and the cathode 20 is grounded. The signal grid 16 of tube 17, as well as the grid 33 of the tube 29 and the grid 3 of tube 1 is connected to the input of the circuit. The other side of the input is grounded. The grids 16 and 33 of tubes 17 and 29 could also be connected as the grid 16 of tube 17 is connected in Figure 1. These are alternative methods and have no bearing on the invention.

The operation of the circuit shown in Fig. 2 is as follows: When a positive pulse is applied to the input, the plate voltage of tube 1 decreases and biases the tube 26 to cutoff. At the same time, such input signal is simultaneously applied to the control grids of tubes 1, 29, and 17 and these tubes are caused to conduct. Conduction of the tube 29 pulls down the voltage on control grid 9 of the tube 10 discharging the interelectrode capacitances of that tube and biasing the tube to cutoff. The capacitive load 21 is now discharged through the tube 17 which is conducting. When the trough of the square wave is reached, the tubes 1, 29, and 17 are biased to cutoff, and the tube 26 is caused to conduct. This raises the voltage of the cathode 28 almost to the B+ voltage, or to approximately the voltage of the grid, and causes the tube 10 to conduct and charge the capacitive load 21.

This circuit has several advantages over the circuit shown in Figure 1. The most important of these are the advantages obtained by the use of the tube 26. If, as in Fig. 1, the final load charging tube 10 were driven directly from the plate of amplifier tube 1, high frequency waveform distortion would necessarily result because the input capacitance of tube 10 constitutes an appreciable load on the amplifier. Such distortion is reduced by employing a tube such as 26 having a smaller capacitance which is connected in series with an equally low capacitance tube 29. The only load on tube 26 is the interelectrode capacitance of the tube 10. Since this capacitance is usually considerably less than that of the load, the tube 26 may be of a type which is capable of handling only small currents. The physical construction including spacing between and size of the structural elements of low current tubes is small as is well known and as a result the interelectrode capacitances are maintained low.

Also, because of the method of deriving the screen grid voltage, the input capacitances of the tube 26 are made even smaller. The screen varies as the cathode, and, since this is a cathode follower, also as the control grid. Therefore the control grid is effectively isolated from the plate. An effective interelectrode capacitance still exists between the screen and plate, but this capacitance is now in the output circuit of tube 26 rather than in the input circuit. By this circuit arrangement (that is, using tube 26 and hooking up the screen grid in the manner described) the capacitive loading of the amplifier stage 1 can be reduced to a very low value. For a given value of amplifier load resistor 6, this means a very rapid rise time (a small R-C time constant), or for a given rise time this makes possible a larger value of resistor 6 and hence a lower power dissipation and greater voltage amplification.

The use of tube 26 effectively reduces the time constant in the output circuit of tube 1 by providing for low input capacitances where a large resistance must be used to provide amplification and reduces the time constant in the input circuit of tube 10 by providing for a low resistance in the charging circuit of the interelectrode capacitances, where large capacitances are unavoidable.

Whereas the tube 26 provides a method for improving the leading edge of the square wave, the tube 29 improves the trailing edge of the wave. The tube 29 provides for the rapid discharge of the interelectrode capacitances of tube 10, thereby insuring that the tube will cut off quickly and not continue to conduct during the discharge period of the capacitive load 21.

The use of a two tube "charge-discharge" type of circuit in the output stage according to the circuit of Fig. 2 results in a marked increase in economy of the D. C. current and power required in spite of the relatively high peak currents usually required of a large capacitive load such as is represented by capacitor 21. It will be noted that the load "charging" tube 10, in Fig. 2 does not employ any plate load resistor. The plate of tube 10 is directly connected to the B+ source and the tube 10 is further employed as a cathode follower but with the cathode impedance comprising a series connected tube 17. The immediate effect of such featured construction enables the capacitive load to be charged more rapidly than if a load resistor were employed. Since higher charging peak currents may thereby be obtained, greater efficiency is achieved.

More specifically, the charging current for the capacitive load as determined by the equation $$i=C\frac{de}{dt} \tag{1}$$

indicates that rapid changes of voltage require relatively large peak charging currents. In the case of a 1000 volt square wave, for example, having a linear rise time of 0.5 $\mu$s, the required charging current would be 1 ampere when the capacitive load is 500 $\mu\mu$f. Similarly, with an exponential type of rise, it can be shown that the initial charging current in this example is 3 amperes. The application of a charging current of such magnitude presents a serious circuit problem since with a conventional circuit, the average required plate circuit current would place excessive demands on the power supply as well as on the circuit.

When conventional amplification is employed using a load resistor in the plate circuit of the load charging tube, the plate current, during the time the tube is conducting is equal to the initial charging current into the capacitive load 21 at the instant following cut off. The reason for this is that the potential across a capacitance cannot change discontinuously; the current through the plate load resistor cannot therefore be discontinuous, but remains constant during the instant it is switched from the tube to the load capacitance. With a 50 percent duty cycle as in the case of a square wave, the average value of this conduction current is one-half the value of the initial charging current. In the present example, if the peak charging current is 3 amperes, the average current would be 1.5 amperes.

A similar situation exists even should the charging tube 10 be employed with a conventional cathode follower circuit because the capacitive load must discharge through the cathode resistor.

In the case of a capacitive load, such average or standby current is wasted because the only useful output is that energy which is momentarily stored in, and then discharged from, the capacitive load 21. An ideal circuit for driving such load would be a circuit in which the only current was that required to charge or discharge the capacitive load consonant with variations in the instantaneous value of the applied signal voltage. For a rectangular waveform signal, such as circuit may be realized by a switch in the load circuit to charge the capacitive load from a D. C. source in one position and then discharge the load by short circuiting. Such circuit would require no standby current but is obviously feasible only for low frequencies.

Under such ideal circuit condition, it can be shown that the useful power delivered to the load is:

$$P_{out}=\frac{CE^2f}{2} \tag{2}$$

while the power taken from the source is $$P_{in}=CE^2f \tag{3}$$

These equations indicate an ideal maximum efficiency of 50 percent. But even such efficiency is unapproachable in the case of a conventional amplifier or cathode follower circuit supplying a capacitive load. For example, in practice, it is possible to achieve efficiencies of the order of only 2 percent as can be shown by applying Equation 2 to the example already considered. In such case, for an assumed frequency of 100 kc. for example, the power output by Equation 2 is 25 watts. The power input comprises approximately the referred to 1.5 ampere average current and the voltage which is 1000 volts according to the example and is therefore 1500 watts. The efficiency is therefore only 1.7 percent.

In accordance with the circuit of Fig. 2, greater efficiency than is obtainable with conventional circuitry results from employing the two series connected tubes 10 and 17. These tubes are driven in opposite phase, and thereby resemble in their operation the described idealized switching arrangement since "charging" tube 10 conducts when "discharging" tube 17 is cut off and vice versa. Moreover, these tubes are biased near cut-off so that with no signal, conduction is negligible and the standby current is thereby kept at a minimum. They therefore function to secure the requisite switching action necessary to supply the capacitive load 21.

The invention has been described as being used with the circuit of Figure 1. It is to be understood that this was done merely for the purpose of explanation and is in no way intended to limit the invention. The invention can obviously be used in any circuit in which an amplifier tube would normally feed an output tube having large interelectrode capacitances. In other words the present invention can be used in most circuits where tubes having large interelectrode capacitances are to be supplied from a circuit having a high value of resistance. For example, the circuit could be used to supply a conventional cathode follower or an amplifier which supplies a load through a transformer connected in the plate circuit of the tube.

It will be apparent that the embodiments shown are only exemplary and that various modifications can be made in construction and arrangement within the scope of my invention as defined in the appended claims.

I claim:

1. An electron tube circuit comprising first and second grid-controlled electron tubes connected in series with a source of direct-current voltage, said first tube having its plate directly connected to the positive side of the direct-current source, a third grid-controlled electron tube, means connected in the cathode circuit of said third tube for varying the impedance of said cathode circuit in response to a change in an applied signal voltage, the grid of said first tube being connected to the junction of the cathode of said third tube and said means, a common source of input signals, signal coupling means connecting said source to said second tube and to said means respectively, and means separate from said impedance varying means for applying said input signals reversed in phase to said third tube.

2. The invention according to claim 1 in which said impedance varying means comprises a grid controlled electron tube having a plate, the cathode of said third tube being directly connected to said plate.

3. The invention according to claim 1 in which said third tube includes a screen grid, said screen grid being connected to the positive side of said positive source through a resistance, and being connected to said junction through a capacitor.

4. The invention according to claim 3 in which said first tube has a screen grid which is directly connected to said junction.

5. The invention according to claim 1 in which said last named means comprises a grid controlled high gain amplifier tube, the plate of which is connected to the grid control circuit of said third tube through a resistance which has a value larger than the internal resistance of said third tube.

References Cited in the file of this patent

UNITED STATES PATENTS

| | | |
|---|---|---|
| 2,517,863 | Froman | Aug. 8, 1950 |
| 2,592,193 | Saunders | Apr. 8, 1952 |
| 2,613,235 | Grunsky | Oct. 7, 1952 |
| 2,631,198 | Parisoe | Mar. 10, 1953 |
| 2,661,398 | Cooper et al. | Dec. 1, 1953 |